US012689419B2

(12) United States Patent
Zhang et al.

(10) Patent No.: US 12,689,419 B2
(45) Date of Patent: Jul. 21, 2026

(54) ENHANCED NEW RADIO (NR) TYPE II CHANNEL STATE INFORMATION (CSI) FEEDBACK USING ANGLE AND DELAY RECIPROCITY

(71) Applicant: Telefonaktiebolaget LM Ericsson (publ), Stockholm (SE)

(72) Inventors: Xinlin Zhang, Gothenburg (SE); Siva Muruganathan, Stittsville (CA); Shiwei Gao, Nepean (CA); Fredrik Athley, Kullavik (SE); Mattias Frenne, Uppsala (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 708 days.

(21) Appl. No.: 17/918,628

(22) PCT Filed: Mar. 15, 2021

(86) PCT No.: PCT/EP2021/056557
§ 371 (c)(1),
(2) Date: Oct. 13, 2022

(87) PCT Pub. No.: WO2021/209206
PCT Pub. Date: Oct. 21, 2021

(65) Prior Publication Data
US 2023/0145057 A1 May 11, 2023

Related U.S. Application Data

(60) Provisional application No. 63/010,311, filed on Apr. 15, 2020.

(51) Int. Cl.
*H04B 7/0456* (2017.01)
*H04B 7/06* (2006.01)
(Continued)

(52) U.S. Cl.
CPC ......... *H04B 7/0481* (2023.05); *H04B 7/0456* (2013.01); *H04B 7/0626* (2013.01);
(Continued)

(58) Field of Classification Search
CPC . H04W 72/02; H04W 72/0453; H04W 72/54; H04L 5/0051; H04B 7/0456; H04B 7/0626; H04B 7/065; H04B 7/0695
See application file for complete search history.

(56) References Cited

U.S. PATENT DOCUMENTS

| | | | | |
|---|---|---|---|---|
| 12,047,989 | B2 * | 7/2024 | Wei | H04B 7/0417 |
| 2003/0228887 | A1 * | 12/2003 | Kishigami | H04B 7/086 455/562.1 |

(Continued)

FOREIGN PATENT DOCUMENTS

| | | |
|---|---|---|
| CN | 105406911 A | 3/2016 |
| CN | 107113040 A | 8/2017 |

(Continued)

OTHER PUBLICATIONS

International Search Report and Written Opinion issued in International Application No. PCT/EP2021/056557 dated Jun. 1, 2021 (17 pages).

(Continued)

*Primary Examiner* — Angela Widhalm de Rodriguez
(74) *Attorney, Agent, or Firm* — Rothwell, Figg, Ernst & Manbeck, P.C.

(57) ABSTRACT

A method (800) performed by a base station (e.g., gNB). The method includes selecting (s802) a set of frequency domain (FD) basis vectors. The method also includes transmitting (s804) to a UE information identifying the selected FD basis vectors.

19 Claims, 11 Drawing Sheets

(51) Int. Cl.

| | |
|---|---|
| *H04L 5/00* | (2006.01) |
| *H04W 72/02* | (2009.01) |
| *H04W 72/0453* | (2023.01) |
| *H04W 72/54* | (2023.01) |

(52) U.S. Cl.
CPC ........... *H04B 7/065* (2013.01); *H04L 5/0051* (2013.01); *H04W 72/02* (2013.01); *H04W 72/0453* (2013.01); *H04W 72/54* (2023.01)

(56) References Cited

U.S. PATENT DOCUMENTS

| | | | |
|---|---|---|---|
| 2016/0156397 A1* | 6/2016 | Onggosanusi ....... | H04B 7/0421 370/252 |
| 2020/0028555 A1 | 1/2020 | Rahman et al. | |
| 2022/0416866 A1* | 12/2022 | Ge ....................... | H04B 7/0482 |

FOREIGN PATENT DOCUMENTS

| | | | |
|---|---|---|---|
| WO | 2016/128095 A1 | 8/2016 | |
| WO | WO-2020143699 A1 * | 7/2020 | ............ H04W 72/21 |

OTHER PUBLICATIONS

International Preliminary Report on Patentability issued in International Application No. PCT/EP2021/056557 dated Jul. 13, 2022 (24 pages).

ZTE, "CSI Enhancement for MU-MIMO Support", 3GPP TSG RAN WG1 Meeting #96, R1-1903343, Athens, Greece, Feb. 25-Mar. 1, 2019 (15 pages).

ZTE, "CSI Enhancement for MU-MIMO Support", 3GPP TSG RAN WG1 Meeting #98bis, R1-1910283, Chongqing, China, Oct. 14-20, 2019 (9 pages).

* cited by examiner

OFDM Symbol # a 14-symbol slot

▨ REs for CSI-RS

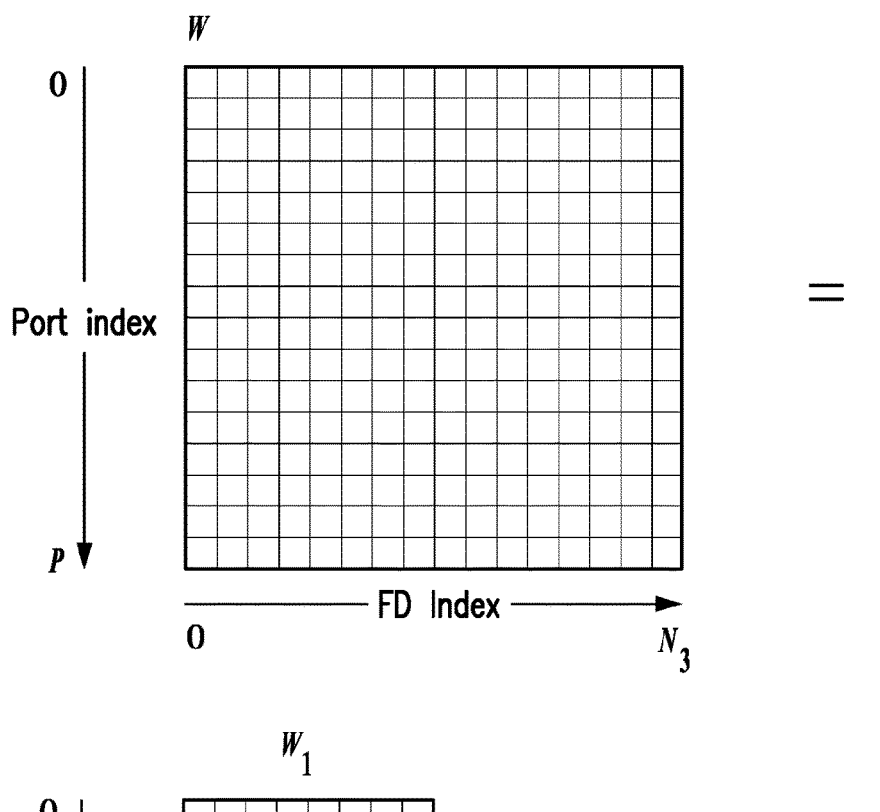
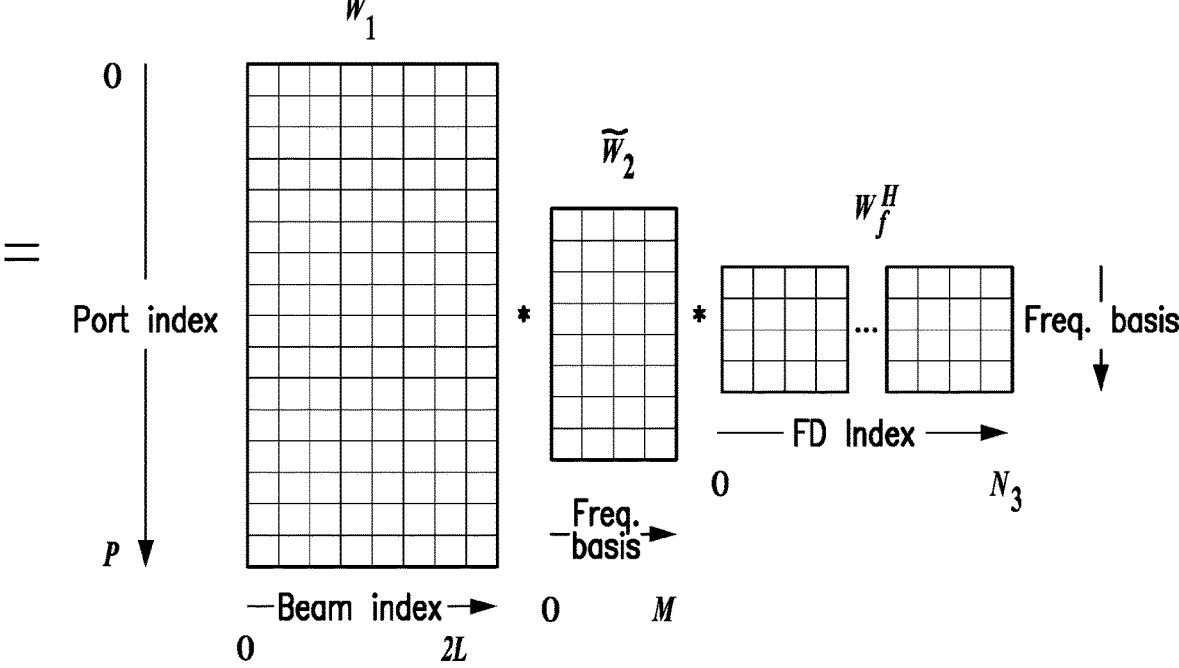
FIG. 4

Step 1:

In UL, UE sounds SRS, while gNB estimates delay $\tau_i$ and angle $\theta_i$, $\varphi_i$ for each cluster.

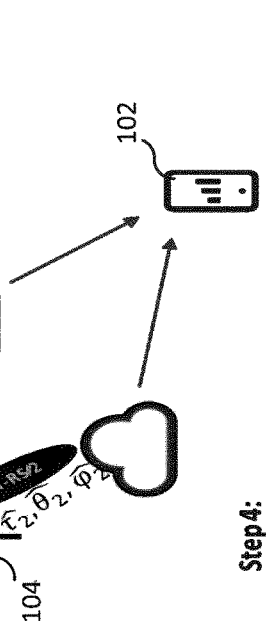

$\tau_1, \theta_1, \varphi_1, g_1$ $\tau_2, \theta_2, \varphi_2, g_2$

Step 2:

In DL, gNB selects dominant clusters and precodes CSI-RS according to the estimates of delay $\hat{\tau}_i$ and angle $\hat{\theta}_i$, $\hat{\varphi}_i$

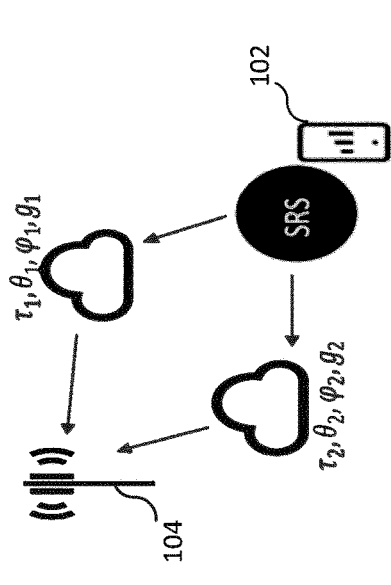

$\hat{\tau}_1, \hat{\theta}_1, \hat{\varphi}_1$ $\hat{\tau}_2, \hat{\theta}_2, \hat{\varphi}_2$

Step 3:

UE estimates the complex gain $\hat{g}_1$, $\hat{g}_2$ for selected beams and feedback to gNB, together with other components of CSI report, such as RI.

CSI report including $\hat{g}_1$, $\hat{g}_2$, RI, etc.

Step 4:

In DL, gNB computes PDSCH precoding matrix based on the CSI report together with the angle/delay estimates, and then performs PDSCH transmission.

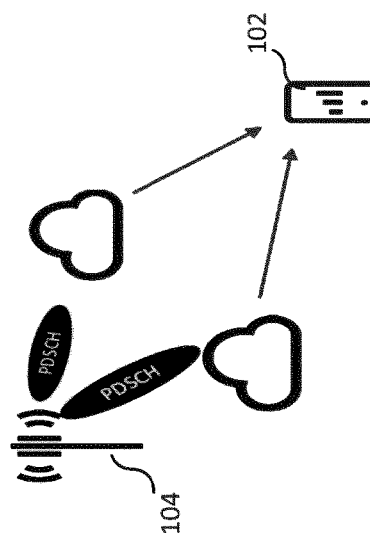

FIG. 5

800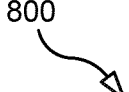
s802
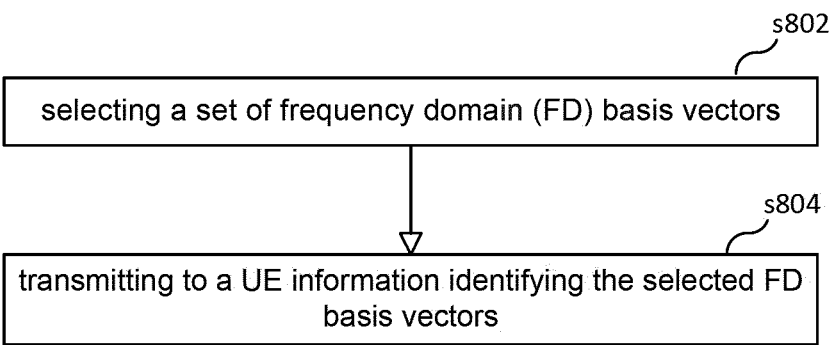
selecting a set of frequency domain (FD) basis vectors
s804
transmitting to a UE information identifying the selected FD basis vectors
FIG. 8

900

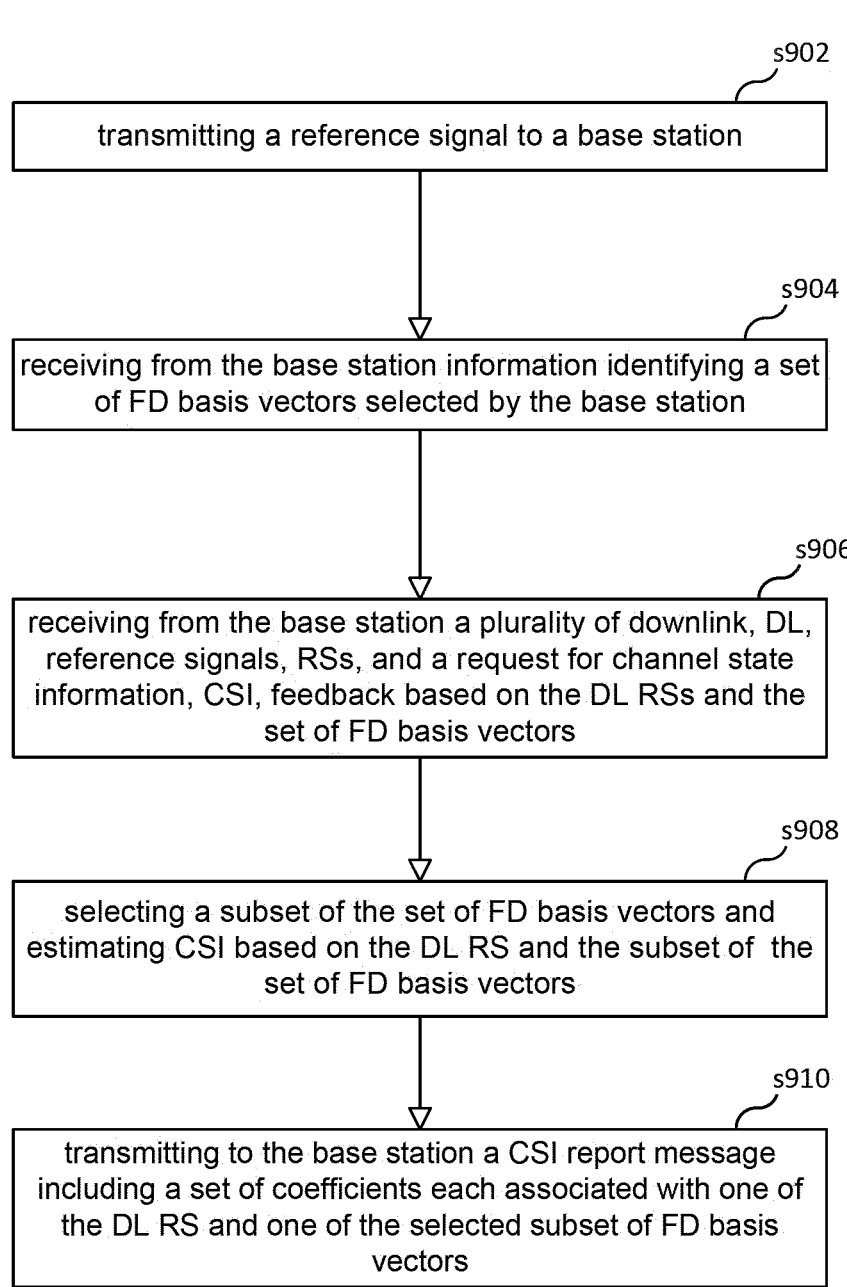

s902 transmitting a reference signal to a base station s904 receiving from the base station information identifying a set of FD basis vectors selected by the base station s906 receiving from the base station a plurality of downlink, DL, reference signals, RSs, and a request for channel state information, CSI, feedback based on the DL RSs and the set of FD basis vectors s908 selecting a subset of the set of FD basis vectors and estimating CSI based on the DL RS and the subset of the set of FD basis vectors s910 transmitting to the base station a CSI report message including a set of coefficients each associated with one of the DL RS and one of the selected subset of FD basis vectors

FIG. 9

ENHANCED NEW RADIO (NR) TYPE II CHANNEL STATE INFORMATION (CSI) FEEDBACK USING ANGLE AND DELAY RECIPROCITY

CROSS REFERENCE TO RELATED APPLICATIONS

This application is a 35 U.S.C. § 371 National Stage of International Patent Application No. PCT/EP2021/056557, filed Mar. 15, 2021, which claims priority to U.S. provisional patent application No. 63/010,311, filed on Apr. 15, 2020. The above identified applications are incorporated by this reference.

TECHNICAL FIELD

This disclosure relates to Channel State Information (CSI) feedback.

BACKGROUND

1.1.1 Codebook-Based Precoding

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The New Radio (NR) standard is currently evolving with enhanced MIMO support. A core component in NR is the support of MIMO antenna deployments and MIMO related techniques like, for instance, spatial multiplexing. The spatial multiplexing mode is aimed for high data rates in favorable channel conditions. An illustration of the spatial multiplexing operation is provided in FIG. 1.

As seen in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols ins each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses Orthogonal Frequency Division Multiplexing (OFDM) in the downlink (and DFT precoded OFDM in the uplink for rank-1 transmission) and hence the received $N_R \times 1$ vector $y_n$ for a certain TFRE on subcarrier n (or alternatively data TFRE number n) is thus modeled by:

$$y_n = H_n W s_n + e_n,$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE.

In closed-loop precoding for the NR downlink, the UE transmits, based on channel measurements in the forward link (downlink), recommendations to its serving base station (a.k.a., gNB) of a suitable precoder to use. The gNB configures the UE to provide feedback according to CSI-ReportConfig and may transmit CSI-RS and configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other information than recommended precoders to assist the gNB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each subband, which is defined as a number of contiguous resource blocks ranging between 4-32 PRBS depending on the band width part (BWP) size.

Given the CSI feedback from the UE, the gNB determines the transmission parameters it wishes to use to transmit to the UE, including the precoding matrix, transmission rank, and modulation and coding scheme (MCS). These transmission parameters may differ from the recommendations the UE makes. The transmission rank, and thus the number of spatially multiplexed layers, is reflected in the number of columns of the precoder W. For efficient performance, it is important that a transmission rank that matches the channel properties is selected.

1.1.2 2D Antenna Arrays

The embodiments presented in this disclosure may be used with two-dimensional antenna arrays and some of the presented embodiments use such antennas. Such antenna arrays may be (partly) described by the number of antenna columns corresponding to the horizontal dimension $N_h$, the number of antenna rows corresponding to the vertical dimension $N_v$ and the number of dimensions corresponding to different polarizations $N_p$. The total number of antennas is thus $N = N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with dual-polarized antenna elements is illustrated in FIG. 2. FIG. 2 shows a two-dimensional antenna array of dual-polarized antenna elements, with horizontal antenna elements and vertical antenna elements.

Precoding may be interpreted as multiplying the signal with different beamforming weights for each antenna prior to transmission. A typical approach is to tailor the precoder to the antenna form factor, i.e. taking into account $N_h$, $N_v$, and $N_p$ when designing the precoder codebook.

1.1.3 Channel State Information Reference Signals (CSI-RS)

For CSI measurement and feedback, CSI-RS are defined. A CSI-RS is transmitted on each antenna port and is used by a UE to measure downlink channel between each of the transmit antenna ports and each of its receive antenna ports. The transmit antenna ports are also referred to as CSI-RS ports. The supported number of antenna ports in NR are {1,2,4,8,12,16,24,32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain resource elements (REs) in a slot and certain slots. FIG. 3 illustrates an example of CSI-RS REs for 12 antenna ports, where 1RE per RB per port is shown.

In addition, interference measurement resource (IMR) is also defined in NR for a UE to measure interference. An IMR resource contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI, i.e. rank, precoding matrix, and the channel quality. Furthermore, a UE in NR may be configured to measure interference based on one or multiple NZP CSI-RS resource.

1.1.4 CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report.

Each CSI reporting setting contains at least the following information:

A CSI-RS resource set for channel measurement

An IMR resource set for interference measurement

Optionally, a CSI-RS resource set for interference measurement

Time-domain behavior, i.e. periodic, semi-persistent, or aperiodic reporting

Frequency granularity, i.e. wideband or subband

CSI parameters to be reported such as RI, PMI, CQI, and CSI-RS resource indicator (CRI) in case of multiple CSI-RS resources in a resource set Codebook types, i.e. type I or II, and codebook subset restriction Measurement restriction Subband size. One out of two possible subband sizes is indicated, the value range depends on the bandwidth of the BWP. One CQI/PMI (if configured for subband reporting) is fed back per subband).

When the CSI-RS resource set in a CSI reporting setting contains multiple CSI-RS resources, one of the CSI-RS resources is selected by a UE and a CSI-RS resource indicator (CRI) is also reported by the UE to indicate to the gNB about the selected CSI-RS resource in the resource set, together with RI, PMI and CQI associated with the selected CSI-RS resource.

For aperiodic CSI reporting in NR, more than one CSI reporting settings, each with a different CSI-RS resource set for channel measurement and/or resource set for interference measurement can be configured and triggered at the same time. In this case, multiple CSI reports are aggregated and sent from the UE to the gNB in a single PUSCH.

1.1.5 DFT-Based Precoders

A common type of precoding is to use a DFT-precoder, where the precoder vector used to precode a single-layer transmission using a single-polarized uniform linear array (ULA) with N antennas is defined as $$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where $k=0,1,\ldots QN-1$ is the precoder index and Q is an integer oversampling factor. A corresponding precoder vector for a two-dimensional uniform planar array (UPA) can be created by taking the Kronecker product of two precoder vectors as $w_{2D}(k,l)=w_{1D}(k)\otimes w_{1D}(l)$. Extending the precoder for a dual-polarized UPA may then be done as $$w_{2D,DP}(k,l,\phi) =$$

$$\begin{bmatrix} 1 \\ e^{j\phi} \end{bmatrix} \otimes w_{2D}(k,l) = \begin{bmatrix} w_{2D}(k,l) \\ e^{j\phi}w_{2D}(k,l) \end{bmatrix} = \begin{bmatrix} w_{2D}(k,l) & 0 \\ 0 & w_{2D}(k,l) \end{bmatrix} \begin{bmatrix} 1 \\ e^{j\phi} \end{bmatrix},$$

where $e^{j\phi}$ is a co-phasing factor that may for instance to be selected from QPSK alphabet $$\phi \in \left\{ 0, \frac{\pi}{2}, \pi, \frac{3\pi}{2} \right\}.$$

A precoder matrix $W_{2D,DP}$ for multi-layer transmission may be created by appending columns of DFT precoder vectors as:

$$W_{2D,DP}=[w_{2D,DP}(k_1,l_1,\phi_1) \quad w_{2D,DP}(k_2,l_2,\phi_2) \quad \cdots \quad w_{2D,DP}(k_R,l_R,\phi_R)],$$

where R is the number of transmission layers, i.e. the transmission rank. In a common special case for a rank-2 DFT precoder, $k_1=k_2=k$ and $l_1=l_2=l$, meaning that $$W_{2D,DP} =$$

$$[w_{2D,DP}(k,l,\phi_1)\, w_{2D,DP}(k,l,\phi_2)] = \begin{bmatrix} w_{2D}(k,l) & 0 \\ 0 & w_{2D}(k,l) \end{bmatrix} \begin{bmatrix} 1 & 1 \\ e^{j\phi_1} & e^{j\phi_2} \end{bmatrix}.$$

Such DFT-based precoders are used for instance in NR Type I CSI feedback.

1.1.6 MU-MIMO

With multi-user MIMO, two or more users in the same cell are co-scheduled on the same time-frequency resource. That is, two or more independent data streams are transmitted to different UEs at the same time, and the spatial domain is used to separate the respective streams. By transmitting several streams simultaneously, the capacity of the system can be increased. This however, comes at the cost of reducing the SINR per stream, as the power must be shared between streams and the streams will cause interference to each-other.

1.1.7 Multi-Beam (Linear Combination) Precoders

One central part of MU-MIMO is to obtain accurate CSI that enables null forming between co-scheduled users. Therefore, support has been added in LTE Rel. 14-16 for codebooks that provides more detailed CSI than the traditional single DFT-beam precoders. These codebooks, referred to as Advanced CSI (LTE), Type II codebooks (NR Rel. 15) and enhanced Type II codebooks (NR Rel. 16) can be described as a set of precoders where each precoder is created from multiple DFT beams. A multi-beam precoder may be defined as a linear combination of several DFT precoder vectors as $$w = \sum_i c_i \cdot w_{2D,DP}(k_i, l_i, \phi_i),$$

where $\{c_i\}$ may be general complex coefficients. Such a multi-beam precoder may more accurately describe the UE's channel and may thus bring an additional performance benefit compared to a DFT precoder, especially for MU-MIMO where rich channel knowledge is desirable in order to perform nullforming between co-scheduled UEs.

1.1.7.1 NR Rel-15 Type II

For the NR Type II codebook in Rel-15, the precoding vector for each layer and subband is expressed in 3GPP TS 38.214 for a given dual-polarization antenna array with $N_1$ and $N_2$ elements in each dimension for each polarization as:

$$W^l_{q_1,q_2,n_1,n_2,p_l^{(1)},p_l^{(2)},c_l} =$$

$$\frac{1}{\sqrt{N_1 N_2 \sum_{i=0}^{2L-1} \left( p_{l,i}^{(1)} p_{l,i}^{(2)} \right)^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1,2$$

If one restructures the above formula and express it a bit simpler, one can form the precoder vector $w_{l,p}(k)$ for a certain layer $l=0,1$, polarization $p=0,1$ and subband $k=0, \ldots, N_{SB}-1$ as $$w_{l,p}(k) = \frac{1}{C} \sum_{i=0}^{L-1} v_i p_{l,i}^{(1)} c_{l,i}(k)$$

Where $v_i = w_{2D}(m_1, m_2) = w_{1D}(m_1) \otimes w_{1D}(m_2)$ is the $i^{th}$ selected 2D beam, $$c_{l,i}(k) = p_{l,i}^{(2)}(k)\varphi_{l,i}(k) \text{ for } p = 0 \text{ and } c_{l,i}(k) = p_{l,L+i}^{(2)}(k)\varphi_{l,L+i}(k)$$

for p=1, and $N_{SB}$ is the number of subbands in the CSI reporting bandwidth. Hence, the change in a beam coefficient across frequency $c_{l,i}(k)$ is determined based on the $2N_{SB}$ parameters $$p_{l,i}^{(2)}(0), \ldots, p_{l,i}^{(2)}(N_{SB} - 1)$$

and $\varphi_{l,i}^{(2)}(0), \ldots, \varphi_{l,i}^{(2)}(N_{SB}-1)$, where the subband amplitude parameter $$p_{l,i}^{(2)}$$

is quantized using 0 or 1 bit and the subband phase parameter $\varphi_{l,i}$ is quantized using 2 or 3 bits (i.e., either QPSK or 8PSK alphabets), depending on codebook configuration.

1.1.7.2 NR Rel-16 Type II

For NR Rel-16 Type II, overhead reductions mechanism has been specified. The rationale is that it has been observed that there is a strong correlation between different values of $c_{l,i}$, for different subbands, and one could exploit this correlation to perform efficient compression in order to reduce the number of bits required to represent the information. This would thus lower the amount of information which needs to be signaled from the UE to the gNB which is relevant from several aspects.

Thus, in NR Rel-16 Type II codebook, a set of frequency domain (FD) DFT vectors over a set of subbands is introduced. The agreed codebook design for NR Rel-16 Type II codebook can be described as follows:

Precoder matrix for all FD-units for a spatial layer is given by a size-P × $N_3$ matrix $W = [w^{(0)} \ldots w^{(N_3-1)}] = W_1 \tilde{W}_2 W_f^H$, where
  $P = 2N_1N_2$ is the number of antenna ports or the spatial domain (SD) dimensions.
  $N_3 = N_{SB} \times R$ is the number of PMI subbands, or the FD dimensions, where
    The value $R = \{1,2\}$ (the PMI subband size indicator) is RRC configured
    $N_{SB}$ is the number of CQI subbands, which is also configured by RRC
    This applies for $N_{SB} \times R \le 13$,
  $W_1$ is size-P × 2L spatial compression matrix, L is a number of selected beams or 2D spatial DFT vectors out of P 2D spatial DFT vectors $\{w_{2D} (m_1, m_2), m_1 = 0, 1 \ldots, N_1; m_2 = 0, 1, \ldots, N_2\}$
  $W_f$ is size-$N_3$ × M frequency compression matrix, M is a number of selected FD basis vectors out of the $N_3$ orthogonal FD DFT basis vectors $\{f_0 f_1 \ldots f_{N_3-1}\}$, where $f_k$ is a size-$N_3$ × 1 frequency domain DFT vector
  $\tilde{W}_2$ is size 2L × M coefficient matrix
  Precoder normalization: the precoding matrix for a given rank and unit of $N_3$ is normalized to norm 1/sqrt(rank)
  RI ($\in \{1, \ldots, RI_{max}\}$) is the rank reported in Part 1 of the CSI report
Spatial domain (SD) compression by $W_1$
  L spatial domain basis vectors (mapped to the two polarizations, so 2L in total) selected Compression in spatial domain using $W_1 = \begin{bmatrix} v_0 v_1 \ldots v_{L-1} & 0 \\ 0 & v_0 v_1 \ldots v_{L-1} \end{bmatrix}$, where $\{v_i\}_{i=0}^{L-1}$ are $N_1N_2$ × 1 orthogonal 2D spatial domain DFT vectors (same as Rel. 15 Type II) from rotated DFT basis
  4 rotation hypotheses per spatial dimension corresponding to 4x oversampling
SD-basis selection is layer-common The value of L = {2,4,6} (number of "beams", SD-basis vectors) is RRC configured L = 6 only supported for limited parameter setting:

$$32 \ Tx, R = 1, (p, \beta) \in \left\{ \left( \frac{1}{4}, \frac{1}{4} \right), \left( \frac{1}{4}, \frac{1}{2} \right), \left( \frac{1}{4}, \frac{3}{4} \right), \left( \frac{1}{2}, \frac{1}{4} \right) \right\}$$

Frequency-domain (FD) compression by $W_f$

Compression via $W_f = [f_{k_0} \ f_{k_1} \ \ldots \ f_{k_{M-1}}]$, where $\{f_{k_m}\}_{m=0}^{M-1}$ are M size-$N_3 \times 1$ orthogonal frequency domain DFT vectors, where $M = \lceil p \times N_3/R \rceil$, and $p = y_0$ for RI = 1-2 and $p = v_0$ for RI = 3-4

The parameters $(y_0, v_0)$ are jointly configured in RRC and take values from $\left\{ \left( \frac{1}{2}, \frac{1}{4} \right), \left( \frac{1}{4}, \frac{1}{4} \right), \left( \frac{1}{4}, \frac{1}{8} \right) \right\}$ Note that M represents the nominal number of FD components.

FD-basis selection is layer-specific but uses a layer-common intermediary subset for N3 > 19

For $N_3 \leq 19$, one-step free selection is used

FD-basis selection per layer indicated with a $\left\lceil \log_2 \binom{N_3 - 1}{M_i - 1} \right\rceil$ bit combinatorial indicator for the $i^{th}$ layer, and $M_i$ is the number of selected FD basis vectors for the $i^{th}$ layer. In TS 38.214, the combinatorial indicator is given by the index $i_{1,6,l}$ where l corresponds to the layer index. This combinatorial index is reported by UE to the gNB per layer per PMI.

For $N_3 > 19$, two-step selection with layer-common intermediary subset (IntS) is used A window-based IntS selection which is fully parameterized with $M_{initial}$, the intermediate basis set consists of FD bases $\mod(M_{initial} + n, N_3)$, $n = 0, 1, \ldots, N_3' - 1$, where $N_3' = 2M$. Note that as specified in TS 38.214, the selected IntS is reported by UE to the gNB by the UE via the index $i_{1,5}$ which is reported as part of the PMI.

The $2^{nd}$ step subset selection is indicated by an $\left\lceil \log_2 \binom{N_3' - 1}{M_i - 1} \right\rceil$ – bit combinatorial indicator for the $i^{th}$ layer in part 2 of the CSI report. In TS 38.214, the combinatorial indicator is given by the index $i_{1,6,l}$ where l corresponds to the layer index. This combinatorial index is reported by UE to the gNB per layer per PMI.

Linear combination by $\tilde{W}_2$ (for layer i)

$$\tilde{W}_2 = \begin{bmatrix} c_{0,0} & \cdots & c_{0,M-1} \\ \vdots & \ddots & \vdots \\ c_{2L-1,0} & \cdots & c_{2L-1,M-1} \end{bmatrix} \text{ is composed of } K = 2LM_i \text{ linear}$$

combination coefficients, where

Coefficient subset selection

Only a subset $K_{NZ,i} \leq K_0 < 2LM_i$ coefficients are non-zero and reported The $2LM_i - K_{NZ,i}$ non-reported coefficients are considered zero and not reported The maximum number of non-zero coefficients per layer is $K_0 = \lceil \beta \times 2LM_0 \rceil$ $\beta \in \left\{ \frac{1}{4}, \frac{1}{2}, \frac{3}{4} \right\}$ is RRC configured For RI = {2,3,4}, the total maximum number of non-zero (NZ) coefficients across all layers $\leq 2K_0$ Coefficient subset selection, for each layer i a size-$2LM_i$ bitmap with $K_{NZ,i}$ ones is indicated in Part 2 of the CSI Indication of $K_{NZ,TOT}$ (the total number of non-zero coefficients summed across all the layers, where $K_{NZ,TOT} \in \{1, 2, \ldots, 2K_0\}$) is given in Part 1 of the CSI, so that Part 2 of the CSI payload can be known Coefficient quantization according to $c_{l,m} = p_{ref} \left( \left\lfloor \frac{l}{L} \right\rfloor \right) \times p(l, m) \times \varphi(l, m)$ Strongest coefficient: the strongest coefficient $c_{l*,m*} = 1$ (hence its amplitude/phase is not reported) indicated with a per-layer strongest coefficient indicator (SCI$_i$)

For RI = 1, a $\lceil \log_2 K_{NZ,0} \rceil$-bit indicator for the strongest coefficient index, SCI, (l*, m*)

-continued

For RI > 1, a $\lceil \log_2 2L \rceil$-bit (i = 0, 1, . . . (RI − 1)). The location (index) of the strongest LC coefficient for layer i before index remapping is $(l_i^*, m_i^*)$ , $SCI_i = l_i^*$, and $m_i^*$ is not reported Index remapping:
  For layer i, the index $m_i$ of each nonzero LC coefficient $C_{l_i,m_i}$ is remapped with respect to $m_i^*$ to $\tilde{m}_i$ such that $\tilde{m}_i^* = 0$ . The FD basis index $k_{m_i}$ associated to each nonzero LC coefficient $C_{l_i,m_i}$ is remapped with respect to $k_{m_i^*}$ to $\tilde{k}_{m_i}$ such that $\tilde{k}_{m_i^*} = 0$. The sets $\{c_{l_i,\tilde{m}_i} \neq c_{l_i^*,0}\}$ and $\{\tilde{k}_{m_i} \neq 0\}$ are reported.
  The index $(l_i, m_i)$ of nonzero LC coefficients is remapped as $(l_i, m_i) \rightarrow (l_i, (m_i − m_i^*)\mathrm{mod}\ M_i)$. The codebook index associated with nonzero LC coefficient index $(l_i, m_i)$ is remapped as $k_{m_i} \rightarrow (k_{m_i} − k_{m_i^*})\mathrm{mod}\ N_3$.

Two polarization-specific reference amplitudes $p_{ref}(0)$, $p_{ref}(1)$
  For the polarization associated with the strongest coefficient $$p_{ref}\left(\left\lfloor \frac{l^*}{L} \right\rfloor\right) = 1 \text{ and hence not reported}$$

For the other polarization, the reference amplitude is quantized to 4 bits:

$$\text{The alphabet is}\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots , \left(\frac{1}{2^{14}}\right)^{\frac{1}{4}}, \text{"reserved"}\right\}$$

(−1.5 dB step size).

For $\{c_{l,m}, (l, m) \neq (l^*, m^*)\}$:
  For each polarization, differential amplitudes p(l, m) of the coefficients calculated relative to the associated polarization-specific reference amplitude and quantized to 3 bits $$\text{The alphabet is}\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\} (-3 \text{ dB step size})$$

Each phase $\varphi(l, m)$ is quantized to 16PSK (4-bit)

FIG. 4 illustrates the agreed codebook structure utilizing both SD and FD compression.

1.1.8 NR Rel-16 Enhanced Type II Port Selection Codebook

Based on the above enhanced Type II codebook, an enhanced type II port selection codebook was also introduced in NR Rel-16, in which it is assumed that each antenna port is actually associated with a 2D spatial beam, thus the beam selection in the enhanced type II codebook becomes port selection instead. The Type II PS CB is intended to be used for beamformed CSI-RS. UE measures the beamformed CSI-RS ports and recommends which ports to use, the selected ports are indicated and reported in a $P_{CSI-RS} \times 2L$ matrix $W_1$ containing only 0s and 1s, where $P_{CSI-RS}$ is the number of beamformed CSI-RS ports. The linear combination coefficient (LCC) matrix $\tilde{W}_2$ and the FD basis $W_f$ are reported in the same way as in regular enhanced Type II codebook.

SUMMARY

Certain challenges presently exist. In FDD operation, the UL and DL transmissions are carried out on different frequencies, thus the propagation channels in UL and DL are not reciprocal. Despite of this, some physical channel parameters, e.g., delays and angles to different clusters, which depend on the spatial properties of the channel but not the carrier frequency, are reciprocal between UL and DL. Such reciprocity can potentially be utilized in a codebook-based DL transmission for FDD in order to, for example, reduce the feedback overhead in UL when NR Type II port-selection codebook is used. However, how to apply UL channel measurements in assisting Type II based DL CSI feedback in an FDD system is a problem.

More specifically, if the Rel. 16 enhanced Type II port-selection codebook is used for FDD operation based on angle and/or delay reciprocity, the frequency-domain (FD) basis $W_f$ still needs to be determined by the UE. Therefore, in the CSI report, the feedback overhead for indicating which FD bases are selected can be large, especially when $N_3$, the number of PMI subbands, is large. Also, the computational complexity at UE for evaluating and selecting the best FD bases also increases as $N_3$ increases.

Utilizing the delay reciprocity between UL and DL, the gNB can pre-determine a subset of FD basis vectors ($\tilde{W}_f$) based on the estimated delay information to the selected clusters in UL. Then, the gNB can signal the UE about this pre-determined subset of $\tilde{W}_f$, and the UE can then evaluate and select FD basis vectors within the pre-determined subset of FD basis vectors.

This has the advantage of reducing the CSI feedback overhead for indicating which FD basis vectors are used. It also has the advantage of reducing the computational complexity for the UE to select the best FD basis vectors, thereby reducing the use of computational resources and extending battery life.

Accordingly, in one aspect there is provided a method performed by a base station (e.g., gNB). The method includes the base station selecting a set of frequency domain (FD) basis vectors. The method also includes the base station transmitting to a UE information identifying the selected FD basis vectors. In some embodiments, the selected FD basis vectors are selected based on measurements of a reference signal (RS) transmitted by the UE. In some embodiments, the RS is a sounding reference signal (SRS). In another aspect there is provided a base station that is configured to perform the method. In another aspect there is provided a computer program stored in a memory of the base station that when run on processing circuitry of the base station causes the base station to perform the method.

In another aspect there is provided a method performed by a UE. The method includes the UE transmitting a reference signal (e.g., an SRS) to a base station. The method also includes the UE receiving from the base station information identifying a set of FD basis vectors selected by the base station. The method also includes the UE receiving from the base station a plurality of downlink (DL) reference signals (RSs) (e.g., CSI-RS), and a request for channel state information (CSI) feedback based on the DL RSs and the set of FD basis vectors. The method also includes the UE selecting a subset of the set of FD basis vectors and estimating CSI based on the DL RS and the subset of the set of FD basis vectors. The method further includes the UE transmitting to the base station a CSI report message including a set of coefficients each associated with at least one of the DL reference signals and at least one of the selected FD basis vectors. In another aspect there is provided a UE that is configured to perform the method. In another aspect there is provided a computer program stored in a memory of the UE that when run on processing circuitry of the UE causes the UE to perform the method.

BRIEF DESCRIPTION OF THE DRAWINGS

FIG. 4 illustrates the agreed codebook structure utilizing both SD and FD compression.

FIG. 5 illustrates a procedure for reciprocity based FDD transmission scheme.

FIG. 8 is a flowchart illustrating a process according to an embodiment.

FIG. 9 is a flowchart illustrating a process according to an embodiment.

DETAILED DESCRIPTION OF EXAMPLES

Enhanced Type II Port Selection Codebook for FDD System

FIG. 5 illustrates a procedure for reciprocity based FDD transmission scheme, assuming that NR Rel. 16 enhanced Type II port-select codebook is used.

In Step 1, a UE 102 transmits a sounding reference signal (SRS) in the UL to thereby allow a gNB 104 to estimate the angles and delays of different clusters, which are associated with different propagation paths.

In Step 2, gNB 104 selects dominant clusters according to the estimated angle-delay power spectrum profile, and, for each of the selected clusters, the gNB precodes one CSI-RS port according to the obtained angle and/or delay estimation.

gNB also selects a set of frequency domain (FD) basis vectors and transmits to the UE information identifying the selected FD basis vectors. For example, the gNB may transmit to the UE a message comprising an index for each FD basis vector included in the selected set of FD basis vectors, wherein the index for a FD basis vector identifies (e.g., points to) the FD basis vector. The selected set of FD basis vectors is selected based on the estimated angle-delay power spectrum profile.

In Step 3 the UE measures the received CSI-RS ports and then determines a type II CSI including RI, PMI for each layer and CQI. The precoding matrix indicated by the PMI includes the best phase and amplitude for co-phasing the corresponding beams. The phase and amplitude for each beam are quantized and fed back to the gNB.

In Step 4, the gNB computes a DL precoding matrix per layer based on the selected beams and the corresponding amplitude and phase feedback and performs Physical Downlink Shared Channel (PDSCH) transmission based the precoding matrices directly (e.g., single user MIMO (SU-MIMO)) or a precoder derived based on the precoding matrices (including the CSI reports from co-scheduled UEs) (e.g., Zero-Forcing precoder in case of multiuser MIMO (MU-MIMO)).

In one embodiment, the gNB can assist the UE for selecting the best M FD basis vectors according to the estimated cluster angles and delays, in order to reduce the feedback overhead for CSI reporting as well as the computational complexity at the UE for selecting the best M FD basis vectors. The gNB can determine the angles and delays to different clusters by analyzing the angle-delay power spectrum of the channel.

Figure 1:
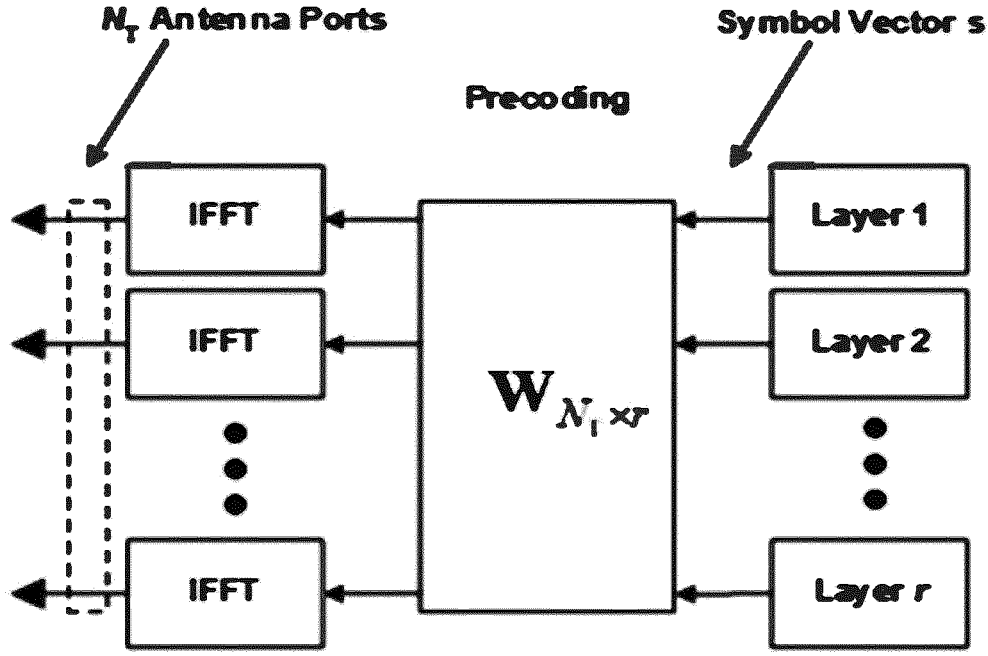
FIG. 1 illustrates a spatial multiplexing operation.
Figure 2:
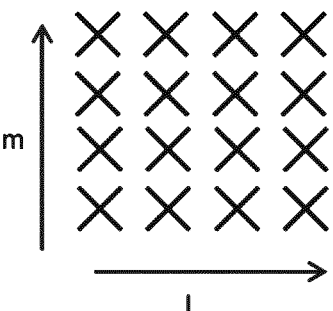
FIG. 2 illustrates an example of a 4×4 array with dual-polarized antenna elements.
Figure 3:
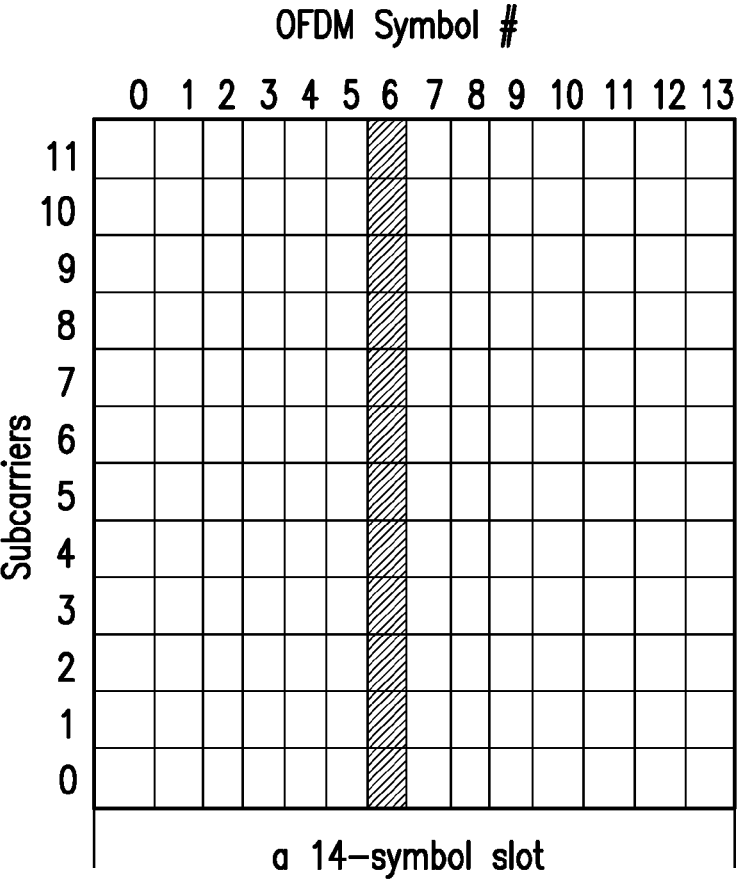
FIG. 3 illustrates an example of CSI-RS REs for 12 antenna ports, where 1RE per RB per port is shown.
Figure 6:
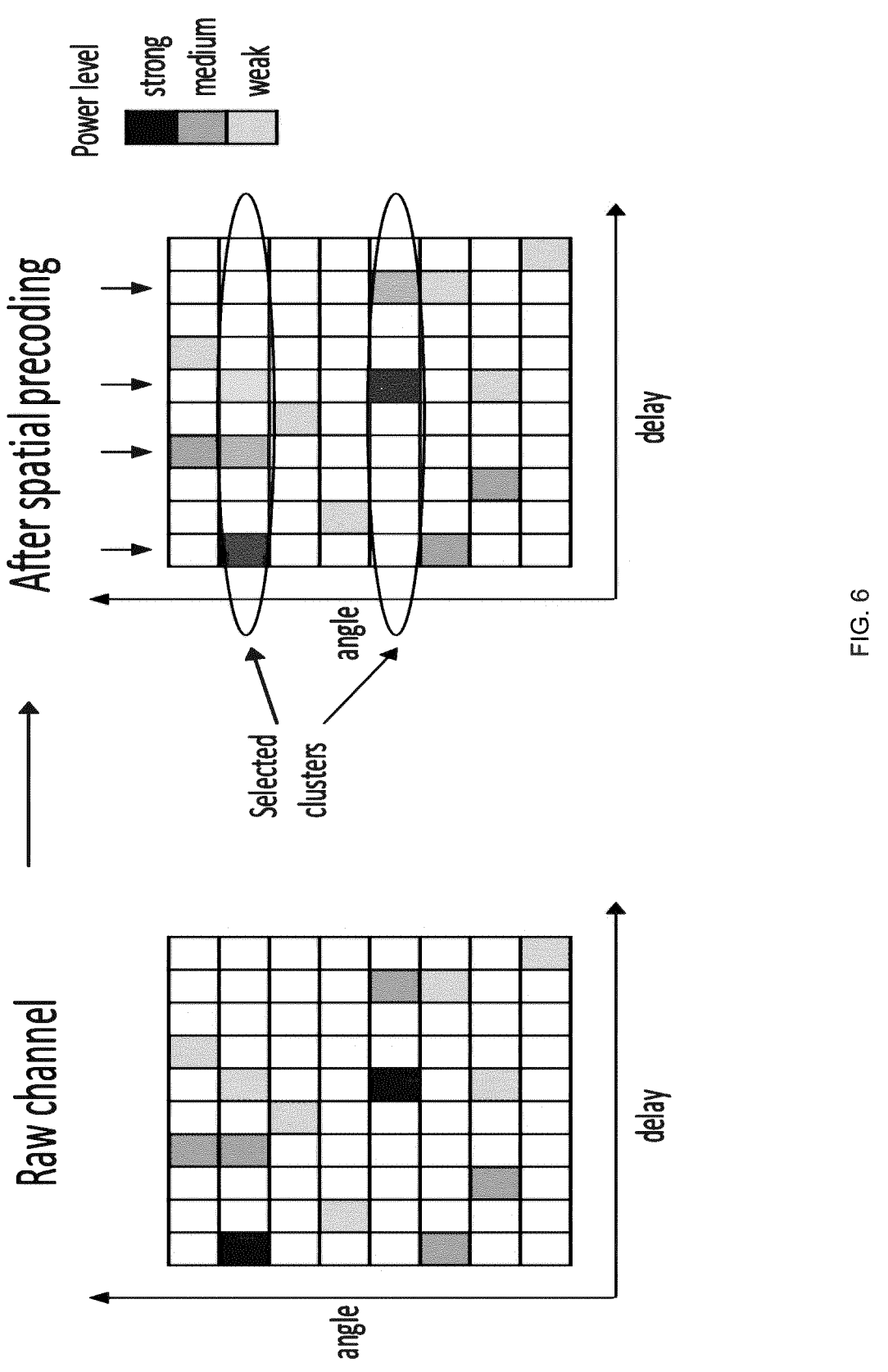
FIG. 6 illustrates an angle-delay power spectrum of a channel before and after spatial precoding.

For example, the 8×10 grid in left part of FIG. 6, shows the angle-delay power spectrum of an UL channel with 8 angle bins and 10 delay taps, where each shaded square represents the power level for a given cluster at certain angle and delay. Based on angle reciprocity, the gNB selects, in this example, 2 strongest clusters and precodes one CSI-RS port per polarization to each cluster (i.e., total 4 CSI-RS ports).

In right part of FIG. 6, there are only 4 taps in the delay domain in the two beamformed channels, while in the original channel there are 10. Therefore, the 4 delay taps that remains, which can be translated to an FD basis with 4 vectors, $\tilde{W}_f=[f_{k_0} \ f_{k_1} \ \ldots \ f_{k_3}]$, can be conveyed by the gNB to the UE, such that the UE only needs to select the best frequency basis vectors from the 4 FD basis vector candidates instead of 10. Thus, in this example, the overhead for indicating which FD bases can be selected can be decreased, and the computation complexity at UE for selecting the best FD bases can be reduced.

In one embodiment, the gNB pre-compensates the delays for each beamformed channel such that the strongest path in all beamformed channels arrive at UE at the same time. The delay pre-compensation can be done, for example, by applying a linear phase slope over frequency on the beamforming weights for each beam, where the slope is given by the delay for the strongest tap in each beam.

Figure 7:
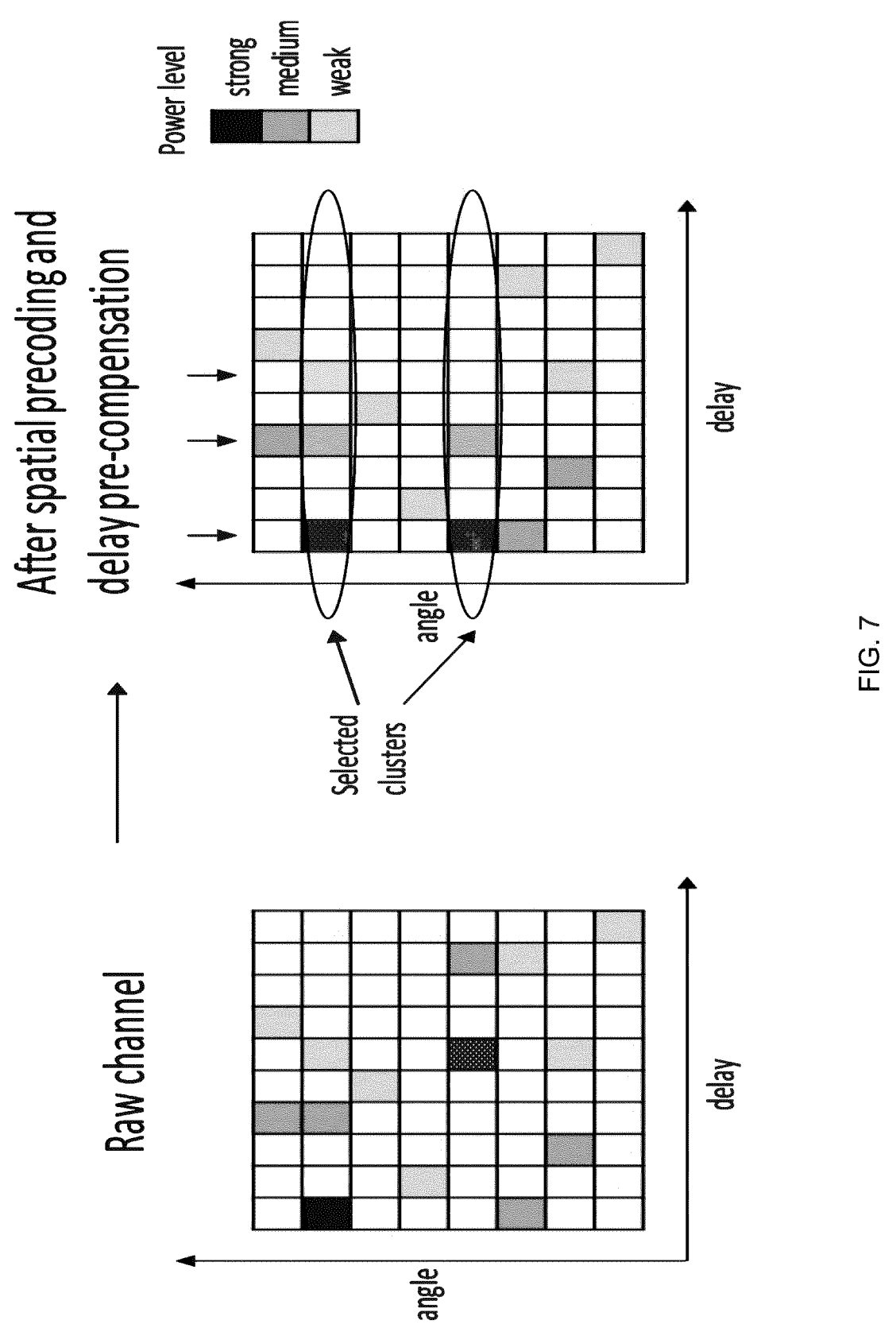
FIG. 7 illustrates an angle-delay power spectrum of a channel before and after spatial precoding and delay pre-compensation.

As seen in FIG. 7, after pre-compensating the delay for the beamformed channels, the number of delay taps reduces to 3, which in the raw channel there were 10 delay taps. Moreover, since the zeroth delay component (which corresponds to the zeroth FD basis vector, i.e., DC basis) always exists, the gNB only needs to signal to the UE the remaining 2 FD basis vectors $\tilde{W}_f=[f_{k_0} \ f_{k_1}]$. Hence, the UE only needs to select the best frequency basis vectors from the 2 FD basis vector candidates instead of 4. Thus, in this example, not only is the overhead for indicating which FD components that have been selected is reduced, but also the overhead in reporting corresponding LC coefficients. Additionally, the computational complexity at UE for selecting the best FD bases can be reduced.

In one embodiment, the gNB pre-determines and signals to the UE a layer-common set of M FD basis vectors $\{f_{k_0}, f_{k_1}, \ldots, f_{k_{M-1}}\}$. The UE, for each transmission layer, may select a subset of respective best FD basis vectors from the set of layer-common FD basis vectors and report to the gNB (as used herein a set A is a subset of a set B whenever each element in set A is also in set B—accordingly, set A need not be smaller than set B (i.e., A may equal B), but set A may not be larger than set B). Note that with this embodiment, the UE does not need to perform a two-step FD-basis selection for large number of PMI subbands (i.e., $N_3$>19) as in the Rel-16 type II enhanced codebooks. Because the gNB already predetermines and signals the layer-common set of M FD basis vectors $\{f_{k_0}, f_{k_1}, \ldots, f_{k_{M-1}}\}$, the UE does not have to report an indication of which subset of FD-basis was selected by the UE. For instance, the index $i_{1,5}$ (which is reported as part of the PMI in the NR Rel-16 enhanced type II CSI report for $N_3$>19) does not need to be reported as part of the PMI report in this embodiment. Accordingly, in this embodiment CSI reporting overhead is reduced. In addition, there are complexity savings as well because the UE does not need to perform window-based Intermediary subset selection in this embodiment.

In one embodiment, the gNB pre-determines and signals to the UE multiple FD basis vector subsets. The UE, for each transmission layer, will select the respective best subset and the corresponding best FD basis vectors from the selected best subset and report to the gNB. In this embodiment, there are complexity savings as well since the UE does not need to perform window-based Intermediary subset selection as done by the UEs in Rel-16 NR enhanced type II CSI feedback.

In some embodiments, the same best FD basis vector subset is selected by the UE for all the layers (i.e., the selected best FD basis vector subset is layer common). In this case, the UE will report one index per PMI to the gNB to indicate the selected best FD basis vector subset.

In some embodiments, different best FD basis vector subsets can be selected by the UE for the different layers (i.e., the selected best FD basis vector subset is layer specific). In this case, the UE will report one index per layer per PMI to the gNB to indicate the selected best FD basis vector subset.

In one embodiment, the gNB signals the UE a layer-specific FD basis subset. The UE, for each transmission layer, will either use all signaled FD basis vectors for the respective layer or select the best FD basis vectors from the respective layer-specific FD basis subset and report to the gNB. If all signaled FD basis vectors for the respective layer are used by the UE, then neither index $i_{1,5}$ (which indicates the selected intermediary subset of FD basis vectors to the gNB in rel-16 type II CSI report) nor the index $i_{1,6,l}$ (which indicates the selected subset of FD basis vectors to the gNB in rel-16 type II CSI report) need to be reported by the UE to the gNB as part of the PMI report. This amounts to notable CSI report overhead savings compared to the Rel-16 type II enhanced CSI reporting.

In some variants of the above embodiment, $N_3=N_{SB} \times R$ and $M=\lceil p \times N_3/R \rceil$ where R is an RRC configured PMI subband size indicator and p is rank dependent higher layer parameter are assumed. For instance, for the embodiment where the whole set of FD basis vectors signaled by the gNB are used by the UE, then the gNB's signaling is expected to have M FD basis vectors. Note that in this case $N_3$ and M are semi-static since they are determined by the RRC configured parameters R, p, and $N_{SB}$. In an alternative embodiment, the gNB may more dynamically signal M' FD basis vectors depending on the angle-delay power spectrum it measured on the uplink. In this case the number of FD basic vectors may also be explicitly indicate to the gNB by the UE. In some embodiments the corresponding $N_3$ (i.e., PMI subband size) can also be indicated to the UE by the gNB. In general, the number of selected beams by the gNB can be indicated to the UE by a number of CSI-RS ports in a CSI request. One method to accomplish this is to configure multiple CSI-RS resources for aperiodic CSI feedback reporting where different resources have different number of CSI-RS antenna ports X. The aperiodic CSI trigger points in the DCI are as in Rel. 15 used to select which of the CSI-RS should be used for CSI reporting, i.e. gNB is selecting an X port CSI-RS resource for the feedback. The UE shall determine the number of FD basis vectors for the CSI feedback based on the value X of the indicated CSI-RS resource.

The amount of delay spread across the selected beams can be translated into channel coherence bandwidth in the frequency domain, which can be used to determine the number of frequency units or subbands (i.e., $N_3$) required in the type II CSI feedback. The determined number of frequency units may be signaled to the UE to adapt the UE channel delay spread.

Furthermore, the power delay profile may also be used to determine a dominant M ($M<N_3$) $\{f_{k_0}, f_{k_1}, \ldots, f_{k_{M-1}}\}$ frequency domain basis vectors out of an FD basis $\{f_0, f_1, \ldots, f_{N_3-1}\}$ for UE to feedback type II CSI. In one embodiment, M adjacent vectors from the FD basis may be selected starting from a basis vector $f_{k_0}$.

FIG. 8 is a flowchart illustrating a process 800 according to an embodiment. Process 800 may begin in step s802. Step s802 comprises selecting a set of frequency domain (FD) basis vectors. Step s804 comprises transmitting to a UE (e.g., UE 102) information identifying the selected FD basis vectors.

In some embodiments, the selected FD basis vectors are selected based on measurements of a reference signal (RS) transmitted by the UE. In some embodiments, the RS is a sounding reference signal (SRS).

In some embodiments process 800 further includes the base station, based on the reference signal transmitted by the UE, estimating angles of arrival and associated power delay profiles of the reference signal, wherein the base station selects the set of FD basis vectors based on the estimated angles and the associated power delay profiles of the reference signal. In some embodiments process 800 further includes the base station transmitting a plurality of down link, DL, reference signals based on: i) the estimated power delay profiles and/or ii) the estimated angles of arrival.

In some embodiments the process further includes transmitting a plurality of down link, DL, reference signals, each associated with one of the angles of arrival and one or more of delays associated with the power delay profiles, and requesting the UE to measure the DL reference signals and feedback a channel state information (CSI) report based on the DL reference signals and the set of FD basis vectors. In some embodiments the DL reference signals are channel state information reference signals (CSI-RS).

In some embodiments the process further includes, after transmitting to the UE the information identifying the set of FD basis vectors and DL reference signals, the base station receiving a CSI report message transmitted by the UE, wherein the message includes a set of coefficients each associated with one of the DL reference signals and one FD basis vector from a subset of the set of FD basis vectors selected by the UE.

In some embodiments the set of FD basis vectors comprises one or more FD basis vectors. In some embodiments the set of FD basis vectors comprises adjacent DFT vectors. In some embodiments the set of adjacent DFT vectors are indicated by an index of the first DFT vector in the set and the total number of DFT vectors in the set.

In some embodiments, when the set of FD basis vectors comprises one FD basis vector, the one FD basis vector may be predetermined as a DFT vector associated with zero hertz frequency.

In some embodiments the length of the DFT vectors is derived from configured parameters.

In some embodiments the set of FD basis vectors are commonly used for all transmission layers. In other embodiments the set of FD basis vectors can be different for different transmission layers.

In some embodiments the transmitting can be via one of radio resource control (RRC) signaling or dynamic signaling in a Physical Downlink Control Channel (PDCCH) or in a Medium Access Control Element (MAC CE).

FIG. 9 is a flowchart illustrating a process 900, according to an embodiment, that is performed by a UE (e.g., UE 102). Process 900 may begin in step s902. Step s902 comprises the UE transmitting a reference signal (e.g., an SRS) to a base station (e.g., gNB 104). Step s904 comprises receiving from the base station information identifying a set of FD basis vectors selected by the base station. Step s906 comprises receiving from the base station a plurality of downlink (DL) reference signals (RSs) (e.g., CSI-RS), and a request for channel state information (CSI) feedback based on the DL RSs and the set of FD basis vectors. Step s908 comprises selecting a subset of the set of FD basis vectors and estimating CSI based on the DL RS and the subset of the set of FD basis vectors. Step s910 comprises transmitting (s910) to the base station a CSI report message including a set of coefficients each associated with at least one of the DL reference signals and at least one of the selected FD basis vectors.

Figure 10:
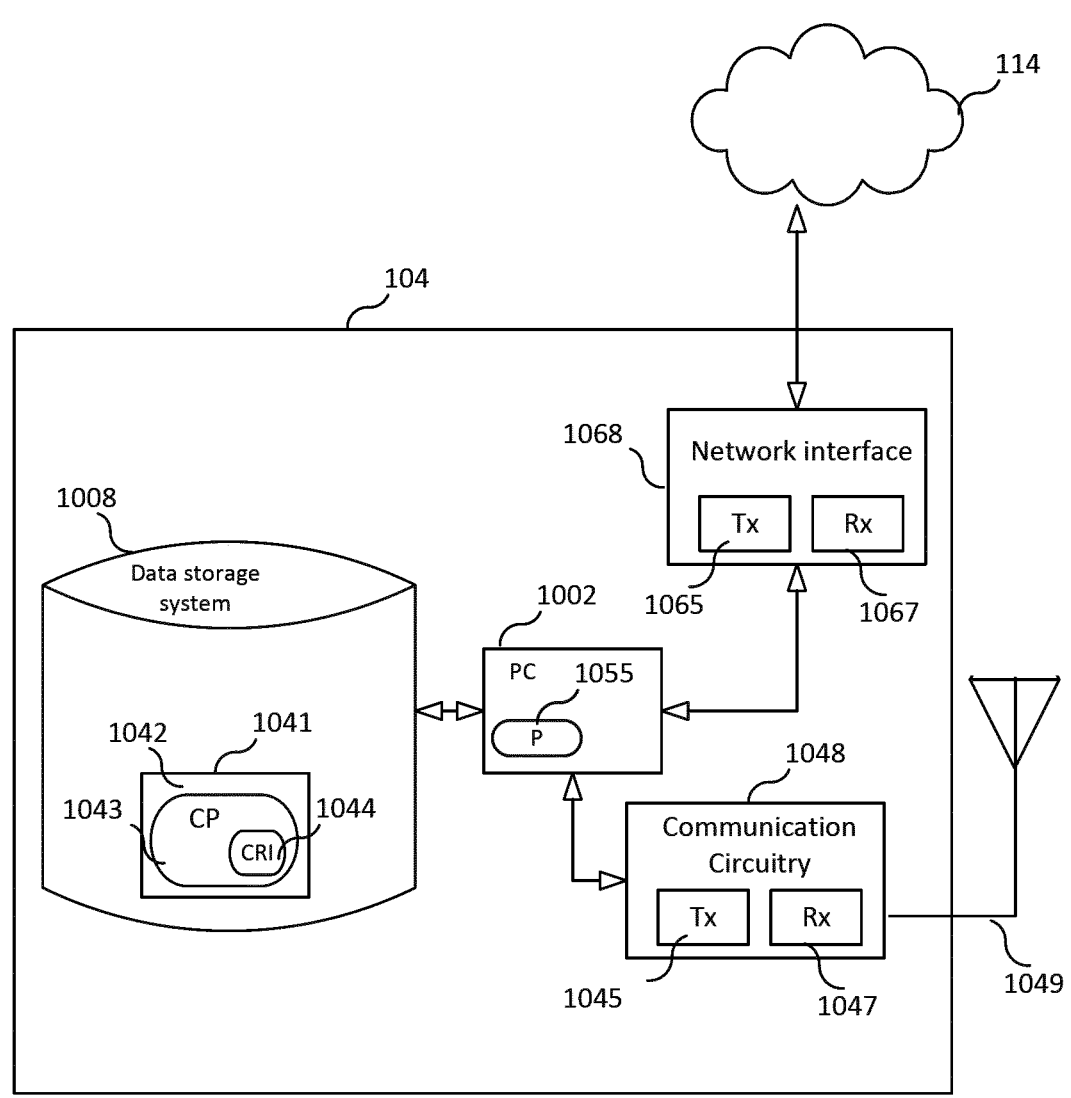
FIG. 10 is a block diagram of a base station according to an embodiment.

FIG. 10 is a block diagram of base station 104, according to some embodiments. As shown in FIG. 10, base station 104 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., base station 104 may be a distributed computing apparatus); a network interface 1068 comprising a transmitter (Tx) 1065 and a receiver (Rx) 1067 for enabling base station 104 to transmit data to and receive data from other nodes connected to a network 110 (e.g., an Internet Protocol (IP) network) to which network interface 1068 is connected; communication circuitry 1048, which is coupled to an antenna arrangement 1049 comprising one or more antennas and which comprises a transmitter (Tx) 1045 and a receiver (Rx) 1047 for enabling base station 104 to transmit data and receive data (e.g., wirelessly transmit/ receive data); and a local storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes base station 104 to perform steps described herein (e.g., steps described herein with reference to the flow charts). In other embodiments, base station 104 may be configured to perform steps described herein without the need for code. That is, for example, PC 1002 may consist merely of one or more ASICs. Hence, the features of the embodiments described herein may be implemented in hardware and/or software.

Figure 11:
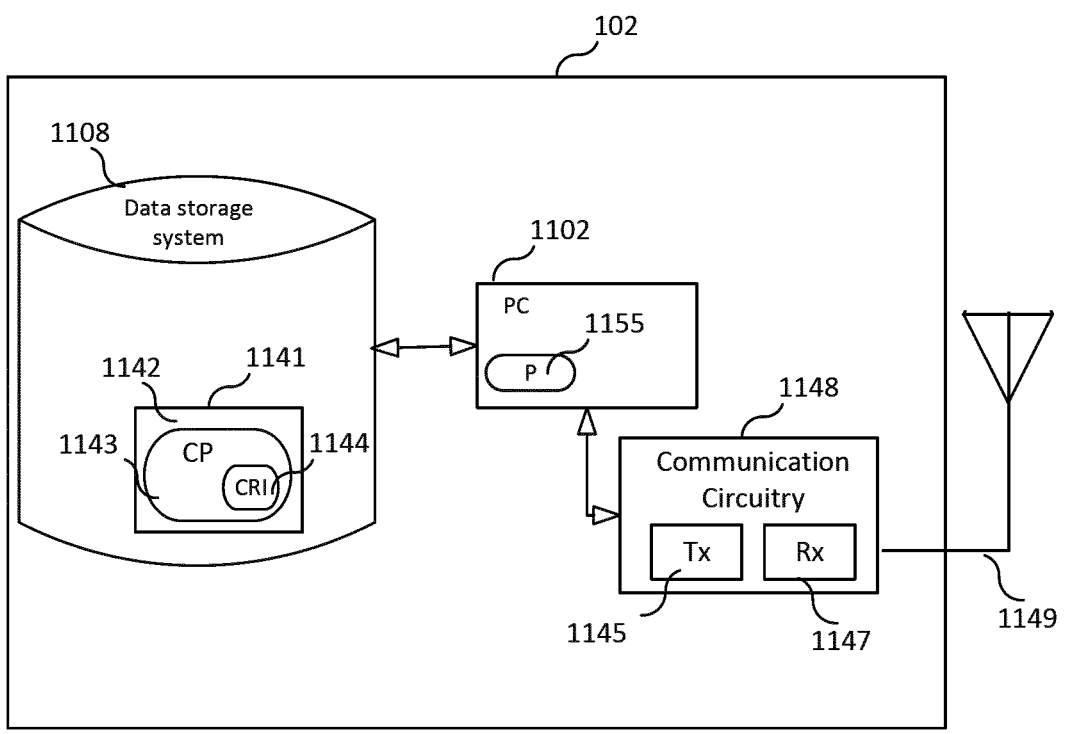
FIG. 11 is a block diagram of a UE according to an embodiment.

FIG. 11 is a block diagram of UE 102, according to some embodiments. As shown in FIG. 11, UE 102 may comprise: processing circuitry (PC) 1102, which may include one or more processors (P) 1155 (e.g., one or more general purpose microprocessors and/or one or more other processors, such as an application specific integrated circuit (ASIC), field-programmable gate arrays (FPGAs), and the like); communication circuitry 1148, which is coupled to an antenna arrangement 1149 comprising one or more antennas and which comprises a transmitter (Tx) 1145 and a receiver (Rx) 1147 for enabling UE 102 to transmit data and receive data (e.g., wirelessly transmit/receive data); and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes UE 102 to perform steps described herein (e.g., steps described herein with reference to the flow charts). In other embodiments, UE 102 may be configured to perform steps described herein without the need for code. That is, for example, PC 1102 may consist merely of one or more ASICs. Hence, the features of the embodiments described herein may be implemented in hardware and/or software.

Summary of Various Embodiments

A1. A method (800) performed by a base station (e.g., gNB 104), the method comprising: selecting (s802) a set of frequency domain, FD, basis vectors; and transmitting (s804) to a UE (e.g., UE 102) information identifying the selected FD basis vectors.

A2. The method of embodiment A1, wherein the selected FD basis vectors are selected based on measurements of a reference signal, RS, transmitted by the UE.

A3. The method of embodiment A2, wherein the RS is a sounding reference signal, SRS.

A4. The method of embodiment A1, A2, or A3, further comprising the base station, based on the reference signal transmitted by the UE, estimating angles of arrival and associated power delay profiles of the reference signal, wherein the base station selects the set of FD basis vectors based on the estimated angles and the associated power delay profiles of the reference signal.

A5. The method of embodiment A4, further comprising the base station transmitting a plurality of down link, DL, reference signals based on: i) the estimated power delay profiles and/or ii) the estimated angles of arrival.

A6. The method of any one of embodiments A1-A5, wherein the method further comprising transmitting a plurality of down link, DL, reference signals and requesting the UE to measure the DL reference signals and feedback a channel state information, CSI, report based on the DL reference signals and the set of FD basis vectors.

A6a. The method of embodiment A6, wherein each of the plurality of DL reference signals is associated with one of the angles of arrival and one or more of delays associated with the power delay profiles.

A7. The method of A6 or A6a, wherein the DL reference signals are channel state information reference signals, CSI-RS.

A8. The method of any one of embodiments A1-A7, further comprising, after transmitting to the UE the information identifying the set of FD basis vectors and DL reference signals, the base station receiving a CSI report message transmitted by the UE, wherein the message includes a set of coefficients each associated with one of the DL reference signals and one FD basis vector from a subset of the set of FD basis vectors selected by the UE.

A9. The method of any one of embodiments A1-A8, wherein the set of FD basis vectors comprises one or more FD basis vectors.

A10. The method of any one of embodiments A1-A9, wherein the set of FD basis vectors comprises adjacent DFT vectors.

A11. The method of embodiment A10, wherein the set of adjacent DFT vectors are indicated by an index of the first DFT vector in the set and the total number of DFT vectors in the set.

A12. The method of any one of embodiments A1-A11, wherein, when the set of FD basis vectors comprises one FD basis vector, the one FD basis vector may be predetermined as a DFT vector associated with zero hertz frequency.

A13. The method of any one of embodiments A1-A12, wherein the length of the DFT vectors is derived from configured parameters.

A14. The method of any one of embodiments A1-A13, wherein the set of FD basis vectors are commonly used for all transmission layers.

A15. The method of any one of embodiments A1-A13, wherein the set of FD basis vectors can be different for different transmission layers.

A16. The method of any one of embodiments A1-A14, where the transmitting can be via one or more of: radio resource control, RRC, signaling, dynamic signaling in a Physical Downlink Control Channel, PDCCH, Downlink Control Information, DCI, or a Medium Access Control Element, MAC CE.

B1. A method (900) performed by a UE, the method comprising: transmitting (s902) a reference signal to a base station; receiving (s904) from the base station information identifying a set of FD basis vectors selected by the base station; receiving (s906) from the base station a plurality of downlink, DL, reference signals, RSs, and a request for channel state information, CSI, feedback based on the DL RSs and the set of FD basis vectors; selecting (s908) a subset of the set of FD basis vectors and estimating CSI based on the DL RS and the selected subset of FD basis vectors; and transmitting (s910) to the base station a CSI report message including a set of coefficients each associated with one of the DL RS and one of the selected subset of FD basis vectors.

B2. The method of embodiment B1, wherein the DL RS is a channel state information RS, CSI-RS.

B3. The method of embodiment B1, wherein the reference signal transmitted by the UE is a sounding Reference Signal, SRS.

B4. The method of embodiment B1, B2, or B3, wherein the selected subset is the same as the set the FD basis vectors.

B5. The method of any one of embodiments B1-B4, wherein the DL RS is a channel state information RS, CSI-RS.

B6. The method of any one of embodiments B1-B5, wherein the reference signal transmitted by the UE is a sounding Reference Signal, SRS.

B7. The method of any one of embodiments B1-B6, wherein the set of FD basis vectors comprises one or more FD basis vectors.

B8. The method of any one of embodiments B1-B7, wherein the set of FD basis vectors comprises adjacent DFT vectors.

B9. The method of embodiment B8, wherein the set of adjacent DFT vectors are indicated by an index of the first DFT vector in the set and the total number of DFT vectors in the set.

B10. The method of any one of embodiments B1-B9, wherein, when the set of FD basis vectors comprises one FD basis vector, the one FD basis vector may be predetermined as a DFT vector associated with zero hertz frequency.

B11. The method of any one of embodiments B1-610, wherein the length of the DFT vectors is derived from configured parameters.

B12. The method of any one of embodiments B1-611, wherein the set of FD basis vectors are commonly used for all transmission layers.

B13. The method of any one of embodiments B1-B12, wherein the set of FD basis vectors can be different for different transmission layers.

B14. The method of any one of embodiments B1-B13, where the receiving from the base station the information identifying the set of FD basis vectors can be via one or more of: radio resource control, RRC, signaling, dynamic signaling in a Physical Downlink Control Channel, PDCCH, a Medium Access Control Element, MAC CE, or Downlink Control Information, DCI.

C1. A computer program (1043) comprising instructions (1044) which when executed by processing circuitry (1002) causes the processing circuitry (1002) to perform the method of any one of embodiments A1-A16.

C2. A computer program (1143) comprising instructions (1144) which when executed by processing circuitry (1102) causes the processing circuitry (1102) to perform the method of any one of embodiments B1-B3.

C3. A carrier containing the computer program of embodiment C1 or C2, wherein the carrier is one of an electronic signal, an optical signal, a radio signal, and a computer readable storage medium (1042, 1142).

D1. A base station (104), the base station being adapted to perform the method of any one of embodiments A1-A16.

D2. A base station (104), the base station comprising: processing circuitry (1002); and a memory (1042), the memory containing instructions (1044) executable by the processing circuitry, whereby the apparatus is operative to perform the method of any one of the embodiments A1-A6.

E1. A UE (102), the UE being adapted to perform the method of any one of embodiments B1-B3.

E2. A UE (102), the UE comprising: processing circuitry (1102); and a memory (1142), the memory containing instructions (1144) executable by the processing circuitry, whereby the apparatus is operative to perform the method of any one of the embodiments B1-B3.

While various embodiments are described herein, it should be understood that they have been presented by way of example only, and not limitation. Thus, the breadth and scope of this disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a base station, the method comprising:

the base station selecting frequency domain basis vectors; and the base station transmitting to a user equipment (UE) information identifying the selected frequency domain (FD) basis vectors selected by the base station, wherein selecting the selected FD basis vectors comprises:

the base station obtaining a measurement of a reference signal (RS) transmitted by the UE; and the base station selecting the FD basis vectors based on the measurement of the RS transmitted by the UE.

2. The method of claim 1, wherein the method further comprises:

the base station, based on a reference signal transmitted by the UE, estimating angles of arrival and associated power delay profiles of the reference signal, wherein the base station selects the FD basis vectors based on the estimated angles of arrival and the associated power delay profiles of the reference signal; and the base station transmitting a plurality of down link (DL) reference signals based on i) the estimated angles of arrival and/or ii) the associated power delay profiles.

3. The method of claim 2, wherein the method further comprises transmitting at least a first downlink (DL) reference signal and requesting the UE to measure the first DL reference signal and feedback a channel state information (CSI) report based on the first DL reference signal and the selected FD basis vectors, and the first DL reference signal is associated with one of the estimated angles of arrival.

4. The method of claim 3, wherein the method further comprises, after transmitting to the UE the information identifying the selected FD basis vectors, the base station receiving a CSI report message transmitted by the UE, and the CSI report message includes at least first coefficient associated with the first DL reference signal and one of the selected FD basis vectors.

5. The method of claim 1, wherein the selected FD basis vectors comprise adjacent DFT vectors.

6. The method of claim 1, wherein, when the selected FD basis vectors consist of one FD basis vector, the one FD basis vector being a DFT vector associated with zero hertz frequency.

7. The method of claim 1, wherein the selected FD basis vectors are commonly used for all transmission layers.

8. A non-transitory computer readable storage medium storing a computer program comprising instructions for configuring the base station to perform the method of claim 1.

9. A base station, the base station comprising:

a transmitter;

memory; and processing circuitry, wherein the base station is configured to perform a method comprising:

selecting frequency domain basis vectors; and employing the transmitter to transmit to a user equipment (UE) information identifying the selected frequency domain (FD) basis vectors selected by the base station, wherein selecting the selected FD basis vectors comprises:

the base station obtaining a measurement of a reference signal (RS) transmitted by the UE; and the base station selecting the FD basis vectors based on the measurement of the RS transmitted by the UE.

10. The base station of claim 9, wherein the method further comprises:

based on a reference signal transmitted by the UE, estimating angles of arrival and associated power delay profiles of the reference signal, wherein the base station selects the FD basis vectors based on the estimated angles of arrival and the associated power delay profiles of the reference signal; and employing the transmitter to transmit a plurality of down link (DL) reference signals based on i) the estimated angles of arrival and/or ii) the associated power delay profiles.

11. A method performed by a user equipment (UE), the method comprising:

transmitting a reference signal to a base station;

receiving from the base station information identifying FD basis vectors selected by the base station;

receiving from the base station a plurality of downlink (DL) reference signals (RSs) and a request for channel state information (CSI) feedback based on the plurality of DL RSs and the FD basis vectors selected by the base station;

selecting a subset of the FD basis vectors selected by the base station and estimating CSI based on the plurality of DL RSs and the subset of the FD basis vectors selected by the UE; and transmitting to the base station a CSI report message including a set of coefficients each associated with one of the plurality of DL RSs and one of the FD basis vectors included in the subset of FD basis vectors selected by the UE.

12. The method of claim 11, wherein
the FD basis vectors selected by the base station comprise
  a first FD basis vector and a second FD basis vector,
the first FD basis vector is included in the subset of FD
  basis vectors selected by the UE, and
the second FD basis vector is not included in the subset of
  FD basis vectors selected by the UE.

13. The method of claim 11, wherein
the FD basis vectors selected by the base station comprise
  a first DFT vector and a second DFT vector, and
the first and second DFT vectors are adjacent.

14. The method of claim 11, wherein
the FD basis vectors selected by the base station include
  a set of adjacent DFT vectors, and
the set of adjacent DFT vectors are indicated by i)
  index of a first DFT vector in the set of adjacent DFT
  vectors and the total number of DFT vectors in the set
  of adjacent DFT vectors.

15. The method of claim 11, wherein the FD basis vectors
selected by the base station consist of one FD basis vector
and the one FD basis vector is a DFT vector associated with
zero hertz frequency.

16. The method of claim 11, wherein the FD basis vectors
selected by the base station are commonly used for all
transmission layers.

17. A non-transitory computer readable storage medium
storing a computer program comprising instructions for
configuring the UE to perform the method of claim 11.

18. A user equipment (UE), the UE comprising:
a receiver;
a transmitter; and
processing circuitry, wherein the UE is configured to
  perform a method comprising:
    transmitting a reference signal to a base station;
    receiving from the base station information identifying
      FD basis vectors selected by the base station;
    receiving from the base station a plurality of downlink
      (DL) reference signals (RSs) and a request for chan-
      nel state information (CSI) feedback based on the
      plurality of DL RSs and the FD basis vectors selected
      by the base station;
    selecting a subset of the FD basis vectors selected by
      the base station and estimating CSI based on the
      plurality of DL RSs and the subset of the FD basis
      vectors selected by the UE; and
    transmitting to the base station a CSI report message
      including a set of coefficients each associated with
      one of the plurality of DL RSs and one of the FD
      basis vectors included in the subset of FD basis
      vectors selected by the UE.

19. The UE of claim 18, wherein
the subset of the FD basis vectors selected by the base
  station is the same as the FD basis vectors selected by
  the base station, and
the FD basis vectors selected by the base station comprise
  adjacent DFT vectors.

* * * * *